UNITED STATES PATENT OFFICE.

KENNETH P. MONROE, OF WASHINGTON, DISTRICT OF COLUMBIA.

METHOD FOR THE EXTRACTION FROM CORNCOBS OF MATERIAL SUITABLE FOR USE AS ADHESIVES AND FOR OTHER PURPOSES.

1,317,380. Specification of Letters Patent. Patented Sept. 30, 1919.

No Drawing. Application filed March 14, 1919. Serial No. 282,699.

(FILED UNDER THE ACT OF MARCH 3, 1883, 22 STAT. L., 625.)

*To all whom it may concern:*

Be it known that I, KENNETH P. MONROE, a citizen of the United States, a resident of Washington, D. C., have devised a new and useful Method for the Extraction from Corncobs of a Material Suitable for Use as an Adhesive and for other Purposes.

This application is made under the act of March 3, 1883, chapter 143 (22 Stat., 625) and the invention herein described and claimed may be used by the Government of the United States, or any of its officers or employees, in the prosecution of work for the Government, and by any person in the United States, without payment to me of any royalty thereon.

My invention relates to the production from corn cobs of a material useful as an adhesive.

In the practice of my invention I digest corn cobs in a suitable vessel by the use of caustic soda (sodium hydroxid) solution at an appropriate high temperature, preferably from 90° C. to 145°. After digestion of the corn cobs is completed in this way the liquid part of the digested material is expressed as completely as possible from the residue of the digested material by pressure or other suitable means and the liquid is then concentrated by evaporation either in the open or under diminished pressure to any desired consistency, whereupon the adhesive is ready for use.

The following experiment may serve as a typical example:

Two (2) kilograms of broken, (but not necessarily ground) corn cobs were digested in a copper kettle with 10 liters of 1% (by weight) sodium hydroxid solution for 1½ hours at the boiling point of the solution under atmospheric pressure (which is slightly in excess of 100° C.) The liquid was then separated from the residue by decantation and pressing in a small hand press, and was then concentrated by evaporation in the open in a large evaporating dish until a suitable concentration (27.7° Baumé) was obtained.

Having thus described my invention, I claim:

A process of making an adhesive consisting in digesting corn cobs in caustic soda solution, in separating by pressure the liquid portion of the digested corn cobs from the residue thereof, and then in concentrating the resulting solution to the desired consistency.

In testimony whereof, I affix my signature in the presence of two subscribing witnesses.

KENNETH P. MONROE.

Witnesses:
FREDERICK B. LA FORGE,
MARSHALL J. GOSS.